United States Patent
Poehlau

(10) Patent No.: US 6,648,786 B1
(45) Date of Patent: Nov. 18, 2003

(54) GEARMOTORS

(75) Inventor: Frank Poehlau, Fuerth (DE)

(73) Assignee: Oechsler Aktiengesellschaft, Ansbach (DE)

( * ) Notice: Subject to any disclaimer, the term of this patent is extended or adjusted under 35 U.S.C. 154(b) by 0 days.

(21) Appl. No.: 09/889,249

(22) PCT Filed: May 9, 1999

(86) PCT No.: PCT/EP00/08624

§ 371 (c)(1),
(2), (4) Date: Jul. 10, 2001

(87) PCT Pub. No.: WO01/31760

PCT Pub. Date: May 3, 2001

(30) Foreign Application Priority Data

Sep. 9, 1999 (DE) .......................................... 199 43 021
Nov. 6, 1999 (DE) .......................................... 199 53 485

(51) Int. Cl.$^7$ ................................................. F16H 23/00
(52) U.S. Cl. .......................................... 475/163; 74/640
(58) Field of Search ........................... 74/640; 475/163, 475/164

(56) References Cited

U.S. PATENT DOCUMENTS

| | | | | |
|---|---|---|---|---|
| 2,953,944 A | * | 9/1960 | Sundt | 475/163 |
| 3,385,135 A | * | 5/1968 | Strandberg | 475/163 |
| 3,532,005 A | * | 10/1970 | Brember, Jr. et al. | 475/163 |
| 4,044,274 A | | 8/1977 | Ohm | 310/83 |
| 4,509,904 A | * | 4/1985 | MacAskill et al. | 74/640 |
| 4,819,975 A | * | 4/1989 | Morishita et al. | 74/640 |
| 5,016,491 A | * | 5/1991 | Poro | 74/640 |
| 5,893,813 A | | 4/1999 | Yamamoto | 475/163 |
| 6,012,347 A | * | 1/2000 | Hasegawa | 74/640 |
| 6,220,115 B1 | * | 4/2001 | Hirn et al. | 74/640 |

FOREIGN PATENT DOCUMENTS

| | | |
|---|---|---|
| DE | 3545788 | 9/1986 |
| DE | 19650716 | 4/1998 |
| DE | 19912761 | 9/1999 |
| EP | 846829 | 6/1998 |
| JP | 04-046244 | * 2/1992 ................. 475/164 |

* cited by examiner

*Primary Examiner*—Sherry Estremsky
(74) *Attorney, Agent, or Firm*—Horst M. Kasper

(57) ABSTRACT

The invention relates to a gear motor which is easy to install and which due to its especially flat design can be utilized in various ways also in narrow spaces. To this end, the gearmotor is provided on one side of a wheel-shaped housing base body with an especially short motor and on the opposite side and in a coaxial relation thereto with a reducing gear. The main gear drive element can be configured integrally with the motor shaft and with a circular disk as the line support for the disk-shaped rotor by plastic injection molding. The track of said line support is introduced in the disk surface as an electroconductive lining by way of MID technology.

18 Claims, 2 Drawing Sheets

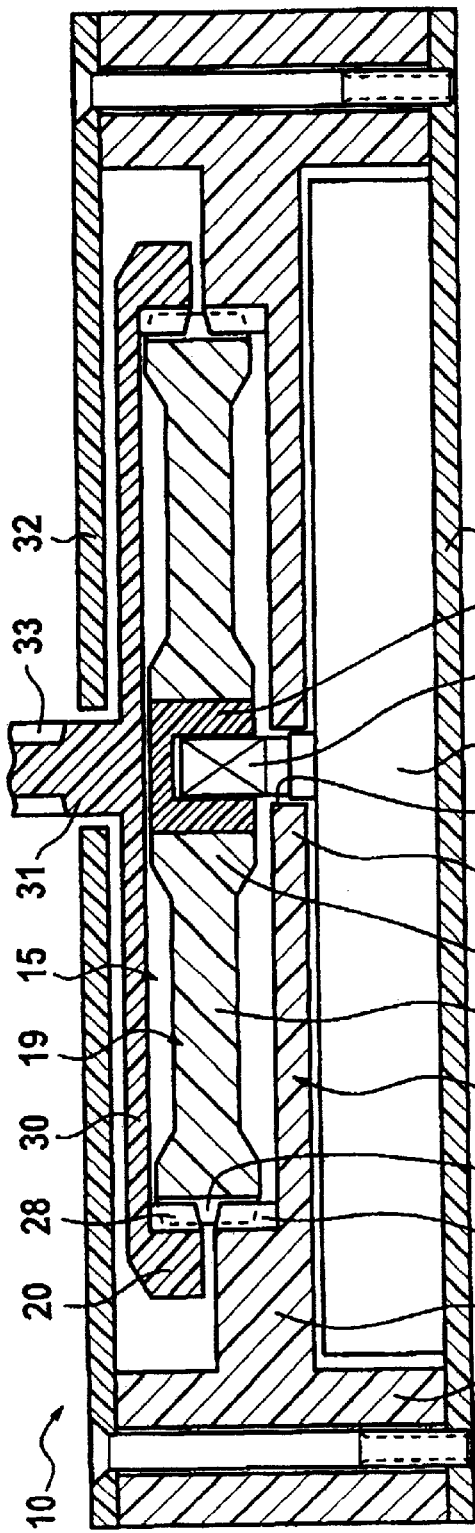
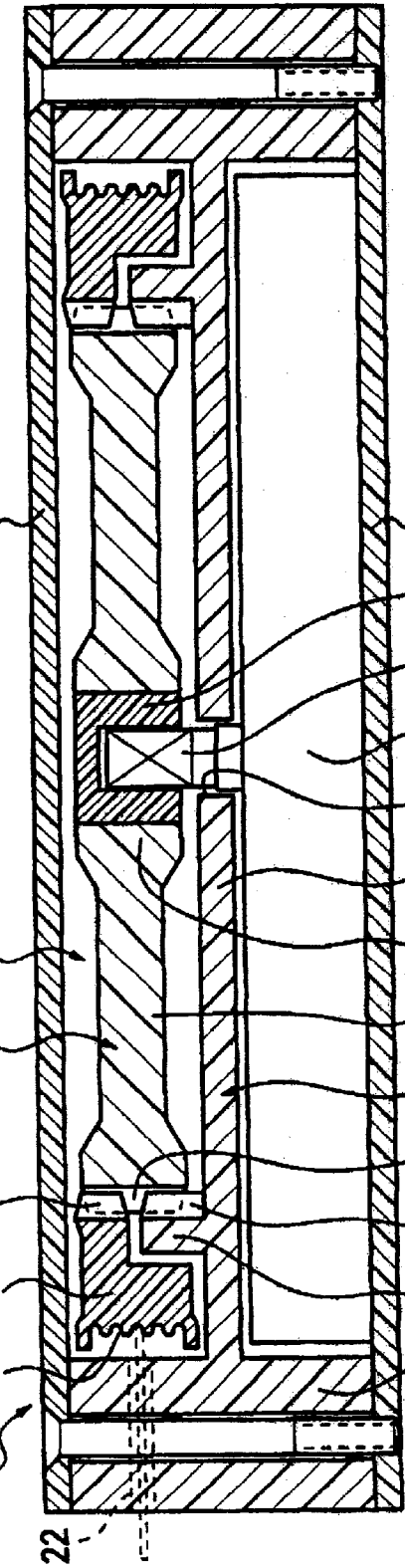

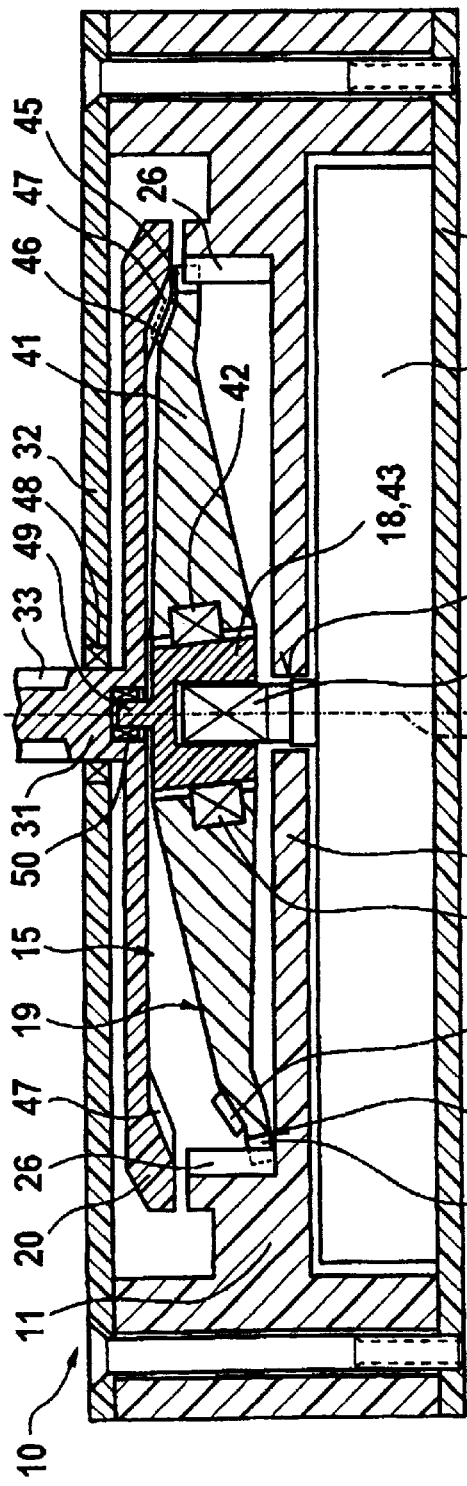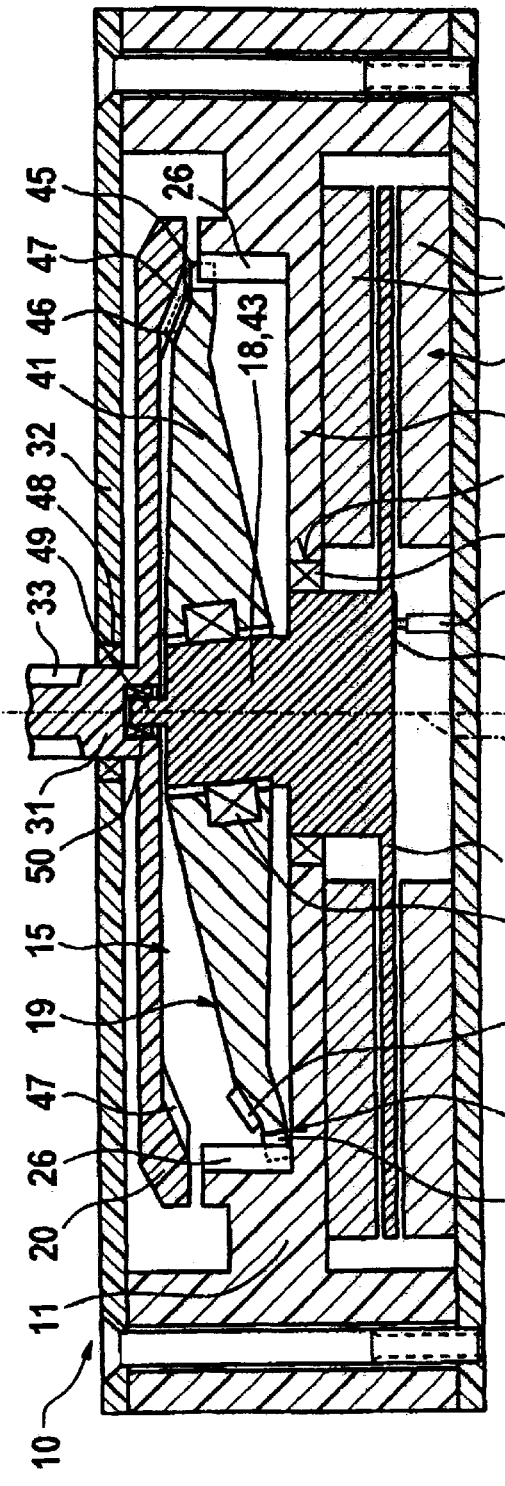

GEARMOTORS

The invention concerns geared motors with a flat construction according to the generic parts of the main claims.

The generic measures for electrical driving devices intended in particular for the adjustment of windows in motor vehicles are known from DE 22 10 243 B2. On one side they have an intermediate wall with an electric motor, the disc armature of which rotates in a flat air gap, and opposite to it has a planetary gear drive in the form of a planetary gear arrangement with a cable drum. The mounting of the armature and of the gear drive takes place in the intermediate wall as well as in the hat-shaped external walls serving as bearing supports, the perimeter of which are bolted to one another and a supporting component via a reinforced edge of the intermediate wall. A disadvantage of this driving device is first of all the high manufacturing cost and the relatively low efficiency of the planetary gear drive as well as the complicated shape of the external walls that are to be dimensioned so that to be a bearing support.

From DE 2 96 22 874 U1 a geared motor with disc armature and planetary gear drive is known, that has the peculiarities that on the circuit board for the control electronics it carries also flat coils for the rotor, while the gear drive can be constructed also as an eccentric drive with a centrally mounted eccentric gear for continuous engagement in the adjacently situated inner gears of hollow wheels. Such a gear drive places also additional requirements on the manufacturing and assembly tolerances, and due to the continuous eccentricity of the load transfer has an even worse gear efficiency even at a moderate reduction ratio.

Therefore the object of the invention is to improve geared motors with flat construction of the type mentioned in the introduction, that are suitable for installation particularly in flat surroundings, like narrow hollow wall spaces in light constructions, but also in functional parts like hollow walls of housings and particularly in hollow spaces of relatively slowly rotating or rotatably adjustable devices, for advertising purposes (rotary displays), for entertainment electronics (rotary tables), for furniture to sit or lie on (recline and level adjustment) or for laboratory purposes (sample turret, agitator), so that they would be characterised by a simpler construction and better kinetic ratios.

This objective is achieved by the essential features of the invention stated in the main claims.

According to them the motor with the flat construction is provided rotationally fixed on one side of an approximately H-shaped housing/base body from a yoke plate with continuous rim flanges. This rim is constructed by becoming thicker towards the periphery of the central disc, by extending on both sides of the edge of the central disc as an axially parallel sleeve having a very thick wall, the axial length of which is approximately the same as the axial thickness of the geared motor, so that practically plane housing covers can be used. Thus the solid collar-shaped or sleeve-shaped rim, that is continuous around the central yoke plate on the periphery of the base body and is more than a mere thickening of the edge, acts directly as an annular, therefore almost hollow-cylindrical housing wall that is axially short when compared with the diameter. The flat housing covers, that are mounted on the face of the rim serve as axial stops for the rotating parts and, if necessary, are appropriately reinforced in the centre, as bearing shield, for example, for the driven stub shaft; thus they complement the construction of the disc geared motor according to the invention that has essentially the form of a circular disc and is very flat in comparison with the diameter.

The drive of the gear drive is a commercially available electric motor with a disc-shaped rotor geometry. Although due to the fact that it has the shape of a disc, and not that of a ring or roller, the rotor rotates relatively slowly, but it is characterised by a high torque in conjunction with a large flywheel mass. Such a motor can be used with a disc rotor, but also as a rotor axially shortened to a disc with windings using the electromagnetic principle.

Such a motor is rotatably joined through a central opening in the central disc of the housing/base body with a reducing gear drive also having a flat construction. Part of this gear drive is a driven ring that rotates coaxially along the inner periphery of the rim, which driven ring can be, in turn, part of a flat bell dome with a driven stub shaft accommodating a driven pinion that is coaxial with the motor. However, instead of this or in addition to the bell stub shaft, on its jacket surface the driven ring can be constructed as a belt pulley, a sprocket or as a cable drum depending from the transmission means used. In that case, in that half of the rim that surrounds the gear drive the driven ring is accessible from the outside through openings in the housing for the transmission means, perhaps for a belt.

Finally, in the region of its periphery the driven ring can be fitted with at least one ferromagnetic part, preferably with a permanent magnet. Due to the magnetic interaction, its [the permanent magnet's] movement of the permanent around the housing of the gear drive carries with it a complementarily fitted rotatable element outside of the housing of the gear drive. Such a contact-free coupling used to transmit force makes the use of a housing hermetically sealed against environmental influences for the entire unit of the disc-shaped geared motor feasible.

In the centre of the gear drive the motor shaft engaging the gear drive carries a drive element, and in an annular space between the drive element and the driven ring at least one transmission element rotates. Consequently, using a very simple construction a very large reduction with very favourable kinetic ratios is delivered by a wave drive, whereby its eccentric, so called wave generator, is rotated as the driven element rotated by the motor in the elastically deformable hub of the sole transmission element, the so called tappet wheel, that can be deformed on the periphery; this is described in detail in DE 197 98 310 A1 or is known form the publication "The harmonic drive electromechanical actuator" by V. O'Gorman in Control Engineering (December 1964, pp. 69–72) as a cylindrical drive acting as a highly dynamic synchronous motor or like an efficient step motor.

The spur gearing of this transmission element, that rotates while being radially deformed, is meshed with the internal teeth on the driven ring and simultaneously also axially in addition to the driven ring with the internal teeth of somewhat greater number on a support ring fixed on the housing, coaxially protruding rib-shaped from the rim or collar-like from the yoke disc. This support ring with the internal teeth can be integrally produced with the housing. However, from the point of manufacturing technology, an accurate roundness can be easier achieved when the ring is manufactured separately and is concentrically installed in the housing.

Instead of the wave drive a wobble wheel drive may be used on that side of the yoke disc which is averted from the motor, especially when no extreme reduction is required.

There are further possibilities of application and advantageous possibilities of manufacturing the compact disc-shaped geared motor by integrating the driving element in the axially flat gear drive with the rotor of the driving motor, what has manufacturing advantages. This integration results in an even simpler assembly of the geared motor with reduced requirements on the part logistics when a support disc for carrying the conductor tracks of a disc armature rotor is integrally produced by plastic injection moulding with the shaft of the gear drive. The conductor track carrier for the electro-motoric function of the rotor connected on the slip ring against a stator with preferably permanent magnets can be appropriately applied to the disc using the MID technology, that is explained in detail in our German patent application 19840665 of May 9, 1998, to which total reference is made herein to avoid repetitions, i.e. by using covering or lamination, in particular by additive or semi-additive chemical metallising methods.

For the detailed explanation of the invention and its advantageous developments and modifications reference is made to the details of the drawing and the following description. The drawing shows, in a very limited schematic illustration and not quite to scale, in:

FIG. 1—a disc geared motor according to the invention in a preferred embodiment, axially sectioned, FIG. 2—the geared motor with an output of the reduced notary movement that is modified from that shown in FIG. 1, FIG. 3—a disc geared motor according to the invention fitted with a tumbler wheel drive, and FIG. 4—a modification of the geared motor shown in FIG. 3 with an integral transition between the motor-and the gear drive.

The geared motor 10 according to the invention has a housing/base body 11, that is not necessarily round, and has an H-shaped cross-section. In the embodiment shown in FIG. 1 it is inverted with one half of its axially short (relative to the diameter) collar-shaped rim 12, that surrounds a central yoke disc 14, over an encapsulated, preferably autarchically functioning pre-assembled disc-shaped motor 13. It [the motor] may have an axially particularly short electromagnetic rotor; or it is a disc armature motor, like the one available from the Baumüller company of Nürnberg with the type designation of GDM 12 ZN. The prevention of the rotation of the disc armature motor 13 in the housing 11 can be achieved already by that its circumference and consequently the inside periphery of the radially adjacent half of the rim are not round; otherwise a separate fixing to prevent rotation is carried out approximately in the transition region between the disc armature motor 13 and the rim 12 by means of clamping pins (not illustrated) that are parallel to the axis or are radially inserted into corresponding recesses.

If the motor 13 on the output side towards the yoke disc 14 is not bound by a flat disc-shape, as this is sketched in a simplified manner, but due to its bearing construction for the drive shaft 16 it has there an obtuse angled truncated cone-shaped design, the adjacent yoke disc 14 is not flat either, but has a hollow truncated cone-shaped or otherwise convex (i.e. somewhat plate-shaped) bulge towards the centre to adapt itself to the inside of the three-dimensional surface of the motor housing. Furthermore, the yoke disc 14 does not have to be enclosed flat, for the operation of the housing/base body 11 a spoke-shaped rigid mounting of the rim 12 on a hub, passed through by the motor shaft 16, should be sufficient. Basically the base body 11 does not need to be a constructive part separated from other housings either; appropriately, even in mass production, particularly the motor housing and the base body are integrally manufactured by plastic injection moulding or metal die casting or by deep-drawing or pressing from sheet metal.

The yoke disc 14 of the housing/base body 11, that is surrounded on the side of the face by the rim 12, forms the central separating wall between the space to accommodate the disc armature motor 13 and a coaxially adjacent space inside the other half of the rim 12 to accommodate an axially flat reduction gear drive 15. This [the gear drive] can be externally pre-assembled or it is completed in the course of insertion of its parts into the space in front of the yoke disc 14. In the centre the gear drive 15 engages the shaft 16 of the disc armature motor 13, the shaft protruding through a central opening 17 of the yoke disc 14 into the gear drive space and engages there in a rotationally fixed manner a drive element 18 of the gear drive 15. Via at least one transmission element 19 this motor-driven drive element 18 moves a driven ring 20 that rotates concentrically with the motor shaft 16 and is guided as a hollow wheel with internal teeth 28 inside the rim 12.

The driven ring 20 can be a crown gear or, according to FIG. 1, a spur gear of the outer part of an axially flat bell dome 30, the central driven stub shaft 31 of which is mounted in a housing shield 32 coaxially with the motor shaft 16 and on that side of the mounting it has, for example, a pinion 33 to transmit outward the reduced rotary movement. However, the output of the rotary movement, that is reduced relative to the rotation of the motor, can be also carried out from the jacket surface 21 of the driven ring 20 rotatably mounted along the cylindrical inner wall of the rim 12, as this is symbolically shown in FIG. 2 by means of a cable or a belt loop through the passages 22 through the rim 12.

According to one version of the invention the gear drive 20 is a wave drive, characterised by an extremely high reduction and small number of individual parts and favourable manufacturing feasibilities using plastic injection moulding technology. In the case of this construction of the gear drive 15 a so called tappet wheel serves as a transmission element 19 with a gear rim 25, the so called flexband, on its face that is radially elastically deformable along its periphery. This is rotated by a drive element 18, the so called wave generator, that is dimensionally stable and eccentric, preferably elliptic-shaped, and rotating in the equally elastically deformable hub 23 of the transmission element 19. The hub 23, that can radially buckle, transfers the ring gear 25, that can radially buckle, in the longitudinal direction, consequently radially to the transmission element 19, the rigid plunger or spokes 24. Due to the elliptical deformation only two diametrically opposing part regions of the ring gear 25 are engaged with an inner gearing 27 fixed on the housing, and both these part regions rotate with the drive element 18. At the same time the ring gear 25 is engaged by a portion of its axial width with the crown or inner gearing 26 of a dimensionally stable rigid support ring 27 protruding coaxially into the gear drive space with a rib shape from the rim 12 (FIG. 1) or with a collar shape from the yoke disc 14 between the rim 12 and the transmission element 19 (FIG. 2). At the same time the axially adjacent region of the radially easily deformable ring gear 25 meshes with the dimensionally stable rigid internal teeth 28 of the driven ring 20. The reduction of the rotational speed will result from the fact that, for example, the number of teeth of the support ring 27, fixed to the housing, is slightly greater than the number of teeth of the ring gear 25 that is rolling on it while radially deforming, the ring gear driving the driven ring 20 with the same or once again reduced rotary speed.

When turning the motor shaft 16, the drive element 18, that may have, for example, an oval cross-section, also rotates and causes in the surrounding hub 23 a peripherally rotating radial bulging, that like a wave movement, presses the continuation of the spokes 24 in succession against the inside of the ring gear 25. Consequently, the gear ring 25 bulges via the spokes 24 at diametrally opposing and peripherally limited peripheral regions, i.e. according to the sectioned illustration of the drawing momentarily pressed into the internal teeth 26/28, while their geared periphery lifts radially off the internal teeth 26/28, because at right angle to the big axis of the oval eccentric no outward displacement of the radial spoke occurs. Due to the different numbers of teeth the rolling of the ring gear 25 on the inner gearing 26, fixed on the housing, is carried out slower than the rotation of the drive element 18 on the motor shaft 16, and the driven ring 20 with its internal teeth 28 (in case of, for example, with same number of teeth) is driven correspondingly slower by the ring gear 25.

After the gear drive 15, preferably designed for the above described wave function, is placed into the housing shell of the base body 11, the thus completed disc/geared motor 10 is enclosed on the face side by means of flat housing covers 29, that in the example illustrated in FIG. 1 fulfil also bearing functions on the driven side, but in FIG. 2 only axial delimiting functions without serving a bearing.

This flat and compact, electrically controllable DC geared motor 10 with, for example, a wire loop carried by a cable drum on the driven ring 20, as this can be particularly seen from FIG. 2, is particularly suitable to be installed in surroundings with flat limitations, to actuate slides, switches and flaps in conveyor and ventilation systems or of a sun roof of a motor vehicle and in the case of a rotating movement according to FIG. 1 it is particularly suitable to be installed in flat bases under rotating parts of apparatuses like agitators, laboratory or assembly tables or furniture to sit or lie on to achieve comfortable positions. Since a typical construction of the geared motor 10 according to the invention measures axially only approx. 45 mm, at a diameter that is approximately three times that of the thickness, it can be easily retrofitted externally on ventilation ducts for the adjustment of dampers, especially because in the case of flatly abutting duct application the small axial thickness of the geared motor 10 does not exceed the limiting dimensions of the joining flanges and does not protrude into the service space.

A geared motor 10, that is easy to install and due to its flat construction has varied applications also in narrow installation spaces, has, according to the invention, on one side of a wheel-shaped housing/base body 11 a disc armature motor 13 and concentric with it and opposite to it a reduction gear drive 15 with a flat construction, wherein one deals preferably with a wave drive with only one rotating transmission element 19 between the driving motor shaft 16 and the driven internal teeth 28.

As a variation of the gear drive construction according to FIG. 1, in the case of FIG. 3 the axially flat gear drive 15 of the geared motor 10 on the output side has in this case a wobble disc 41 as intermediate gear 19. The wobble disc is carried via antifriction bearings 42 by a drive element 18 in the form of a shaft 43, that is joined in a rotationally fixed manner with the driving motor shaft 16, but its axis 44 is tilted relative (it is simultaneously the axis of the gear drive). For this reason the intermediate gear 19, carried by the shaft 43, is not exactly at right angle to the axis 44 of the drive gear, but is inclined in the transverse direction, by virtue of which due to the rotation of the drive element 18 it carries out a wobbling rotary movement.

By claws 25 this wobble disc 41 radially engages the sliding guides 26 that have parallel axes and are fixed to the housing like a spur gear 45, namely due to the wobbling movement at a constantly changing axial height (see the momentary engaged positions on the left bottom and right top of the drawing). At the same time a crown gear 46 (displaced radially inward from the former engagement) on the wobble disc 41 is engaged gear-like over a short arc with a complementary crown gear 47 on the axially adjacent, somewhat bell dome-shaped, driven ring 20. Its driven stub shaft 31, fitted with a pinion 33, is mounted in 48 and 50 in the housing plate 32 and/or on a coaxial stub shaft 49 on the drive element 18.

Thus the rolling of the crown gears 46/47, engaged only by a short arc, along one another, supported against the sliding guides 26 fixed to the housing, results in a rotary movement of the driven stub shaft 31 protruding coaxially from the housing of the geared motor 10, wit a speed that is reduced relative the rotational speed of the motor shaft 16.

In the case of the variation according to FIG. 4, the disc-shaped rotor 51 represents a single-piece plastic injection moulded part with its shaft 16 with the wobble shaft 43 as the drive element 18 for the gear drive 15 together with the bearing stub shaft 49. Between the shaft 43 of the wobble disc 41, that is inclined relative the axis 44 of the gear drive, and the motor shaft 16 extends an extension that is coaxial with the latter through the opening 17 on the yoke disc 14 of the housing/base body 11, in which opening at least one radially supporting bearing 52 is provided. The stator of the disc armature motor 13 is provided in the form of axially magnetised annular permanent magnets 53 axially on both sides of the rotor 51 on the central housing/yoke disc 14 and on the housing/cover 29 on the motor's side. The conducting tracks 54 on the rotor, including their slip rings to provide contact to the commutator brushes 55 fixed on the housing, are provided at least on one of the two surfaces of the rotor disc 51, preferably in accordance with the above mentioned MID method in the shape of a structured metallising applied directly to the plastic material.

Thus the drive motor 13 is directly integrated in the gear drive 15 of this axially flat geared motor 10, resulting in the reduction of the logistical and assembly expenses in the production when compared with separately built functional groups that are first combined only during their assembly in the housing according to FIGS. 1–3.

As far as the advantageous applications of such geared motors 10 and their individual functions are concerned, reference is made to the explanations regarding FIGS. 1 and 2. According to that the external jacket surface of the driven ring 20 can have a construction, for example, to wind up or move transmission means. The driven ring 20 can have at least one magnet fitted to it, that is magnetically contact-free coupled with a driven element rotatably mounted outside of the housing, that driven element being at least partially ferromagnetic or is fitted with ferromagnets, so that the driven ring 20, rotatably mounted within the housing and fitted with at least one magnet, can rotate in a hermetically enclosed housing.

In any case, according to the invention the geared motor 10 according to the versions shown in FIGS. 3 and 4, that is easy to install and can have many applications even in narrow spaces due to the particularly flat construction, has a disc armature motor 13 on one side of a wheel-shaped housing/base body 11, and situated opposite concentrically a reduction gear drive 15, where one deals in this case with a wobble wheel drive. The central drive element 18 of the reduction gear drive 15, be it a wobble wheel gear drive or a wave gear drive, can be advantageously constructed by plastic injection moulding integrally with the motor shaft 16 and with a circular disc as the conductor carrier for a disc armature rotor 51, the conducting tracks 54 of which and the commutator slip rings are applied to the surface of the disc as electrically conductive lamination in accordance with the MID method.

What is claimed is:

1. A geared motor (10) with a flat construction as a sub-assembly of a motor and a gear drive in a housing with an axially short housing/base body (11), that is fitted on one side of a yoke disc (14) with a motor (13) having a disc-shaped rotor geometry and on the opposite side with a gear drive (15), that is driven through the yoke disc (14) by the motor (13) and is fitted with a coaxially rotating driven ring (20), while the driven ring (20) has internal teeth (28) that are axially adjacent to an inner gearing (26) of a support ring (27), characterised in that an H-shaped housing/base body (11) is fitted with a drive within its rim (12) surrounding the yoke disc (14), wherein the yoke disc (14) is broken out like spokes or is enclosed by a flat face, the driven ring (20) being a part of the wave drive, while simultaneously both internal gearings (28, 26) mesh with a portion of a gear rim (25) of a radially flexible transmission element (19) that has a hub (23) continuously expanded by a motor-driven eccentric, wherein the rim sleeve (12) supports substantially flat casing covers (29, 32), wherein the casing covers (29, 32) serve as axial stops for the parts of the gear drive (15) or, respectively, of the motor (13) on two sides of the base body (11), wherein the parts are rotating below the casing covers (29, 32), wherein a disk shaped rotor (51) of the motor (13) together with the motor shaft (16) and the drive element (18) is formed as a single piece and wherein the lead guide required for an electromotoric function is supported applied in Molded Interconnection Device MID technology.

2. A geared motor according to claim 1, characterised in that the housing of the motor (13) is constructed integrally with the housing/base body (11).

3. A geared motor according to claim 1, characterised in that the internal teeth (28) are part of the driven ring (20), wherein the driven ring (20) is flat bell-shaped and wherein the driven shaft (20) has a driven stub shaft (31), wherein the driven shaft (31) is coaxially mounted with a motor shaft (16) and axially opposite to the motor shaft (16) in a housing shield (32).

4. The geared motor according to claim 1, wherein a drive element (18) having an axially symmetrical extension passes through the yoke disc (14) with the axially symmetrical extension and on the opposite side has a rotor (51) of the motor (13) that rotates between axially offset permanent magnets (53), wherein the motor (13) is short in axial direction.

5. A geared motor with a flat construction as a sub-assembly of a motor and a gear drive in a housing with an axially short housing/base body (11), that is fitted on one side of a yoke disc (14) with a motor (13) having a disc-shaped rotor geometry and on the opposite side with a gear drive (15), that is driven through the yoke disc (14) by the motor (13) and is fitted with a coaxially rotating driven ring (20), while the driven ring (20) has internal teeth (28) that are axially adjacent to an inner gearing (26) of a support ring (27), characterised in that an H-shaped housing/base body (11) is fitted with a wave drive within its rim (12) surrounding the yoke disc (14), wherein the yoke disc (14) is broken out like spokes or is enclosed by a flat face, the driven ring (20) being a part of the wave drive, while simultaneously both internal gearings (28, 26) mesh with a portion of a gear rim (25) of a radially flexible transmission element (19) that has a hub (23) continuously expanded by a motor-driven eccentric, wherein the driven ring (20) is fitted at least with one magnet, that is contact-free coupled with a driven element rotatably mounted outside of the housing, that is at least partially ferromagnetic or is fitted with ferromagnets.

6. A geared motor according to claim 5, characterised in that a support disc is made from plastic material and is furnished with a structurised metallising according to the MID technology for the current circuit of the disc rotor (51).

7. A geared motor (10) with a flat construction as a sub-assembly of a motor and gear drive in a housing with an axially short housing/base body (11), that on one side of a yoke disc (14) is fitted with a motor (13) with a disc-shaped rotor geometry and on the opposite side with a gear drive (15) that is driven through the yoke disc (14) by the motor (13), characterised in that an H-shaped housing/base body (11) is fitted with a wobble wheel drive within its rim (12) surrounding the yoke disc (14) that has spokes or is enclosed by a flat; a driven ring (20) being a part of the wobble wheel drive, wherein a drive element (18) having an axially symmetrical extension passes through the yoke disc (14) with the axially symmetrical extension.

8. A geared motor (10) with a flat construction as a sub-assembly of a motor and gear drive in a housing with an axially short housing/base body (11), that on one side of a yoke disc (14) is fitted with a motor (13) with a disc-shaped rotor geometry and on the opposite side with a gear drive (15) that is driven through the yoke disc (14) by the motor (13), characterised in that an H-shaped housing/base body (11) is fitted with a wobble wheel drive within its rim (12) surrounding the yoke disc (14) broken out like spokes or is enclosed by a flat face; a driven ring (20) being a part of the wobble wheel drive, wherein a drive element (18) having an axially symmetrical extension passes through the yoke disc (14) with the axially symmetrical extension and on the opposite side has a rotor (51) of the motor (13) that rotates between axially offset permanent magnets (53), wherein the motor (13) is short in axial direction.

9. A geared motor according to claim 8, characterised in that the yoke disc (14) has a bearing (52) for the extension.

10. A geared motor according to claim 8, characterised in that the support disc is made from plastic material and is furnished with a structurised metallising according to the MID technology for the current circuit of the disc rotor (51).

11. A geared motor with a flat construction as a sub-assembly of a motor and gear drive in a housing with an axially short housing/base body (11), that on one side of a yoke disc (14) is fitted with a motor (13) with a disc-shaped rotor geometry and on the opposite side with a gear drive (15) that is driven through the yoke disc (14) by the motor (13), characterised in that an H-shaped housing/base body (11) is fitted with a wobble wheel drive within its rim (12) surrounding the yoke disc (14) broken out like spokes or is enclosed by a flat face; a driven ring (20) being a part of the wobble wheel drive, wherein a support disc for a current circuit of the disc rotor (51) is integrally constructed with the extension.

12. A geared motor according to claim 11, characterised in that a support disc is made from plastic material and is furnished with a structurised metallising according to the MID technology for the current circuit of the disc rotor (51).

13. A geared motor (10) constructed very flat in comparison to a diameter of the geared motor (10), wherein the geared motor (10) forms a construction unit of a motor (13)

and a gear drive (15) in a housing, wherein the casing exhibits a base body (11) in the form of a central, broken out or closed yoke disk (14), wherein the yoke disk (14) is at the same time part of a motor casing and part of a gear drive casing, wherein circulating rim flanges formed as a rim sleeve (12) disposed parallel to an axis of the motor (13) and having a very large wall thickness, wherein the rim sleeve (12) supports substantially flat casing covers (29, 32), wherein the casing covers (29, 32) serve as axial stops for the parts of the gear drive (15) or, respectively, of the motor (13) on two sides of the base body (11), wherein the parts are rotating below the casing covers (29, 32), wherein the motor (13) is flat and is standing in rotary connection with a motor shaft (16) of the motor (13) through a central opening with a drive element (18) of the gear drive (15), wherein the gear drive (15) is furnished equally of flat construction, wherein a disk shaped rotor (51) of the motor (13) together with the motor shaft (16) and the drive element (18) is formed as a single piece and wherein the lead guide required for an electromotoric function is supported applied in Molded Interconnection Device MID technology, and wherein the gear drive (15) is flat constructed and exhibits a bell-shaped and axially flat driven ring (20) having an inner toothing (28, 47) and disposed coaxial to the motor (13) and circulating along the inner periphery of the rim flange and circulating coaxially relative to the inner periphery of the rim flange, wherein the gear drive (15) exhibits a transfer element (24, 41) having outer teeth in an annular space disposed between the driven ring (20) and the drive element (18), wherein the transfer element (24, 41) combs with the driven ring (20), wherein a support ring (27) having inner teeth is separately produced and is mounted to the yoke disk (14) or to the rim sleeve of the base body.

14. A geared motor (10) according to claim 13, characterised in that motor shaft (16) is fitted rotationally fixed with a shaft (43) as a drive element (18), a jacket surface of which has an axis that is inclined relative to the axis (44) of the gear drive and has a bearing (42) for a wobble disc (41) that is fixed to the housing, wherein the wobble disc (41) is rotationally supported on the side of the front face of the wobble disc (41) and at the same time with a circumferential portion of a crown gear (46) engages the axially adjacent region of a complementary crown gear (47) of the driven ring (20).

15. The geared motor according to claim 13, characterized in that the driven ring (20) is fitted at least with one magnet, that is contact-free coupled with a driven element rotatably mounted outside of the housing, that is at least partially ferromagnetic or is fitted with ferromagnets.

16. The geared motor according to claim 13, further comprising a wobble drive connected to the motor (13).

17. The geared motor according to claim 13, wherein a drive element (18) having an axially symmetrical extension passes through the yoke disc (14) with the axially symmetrical extension and on the opposite side has a rotor (51) of the motor (13) that rotates between axially offset permanent magnets (53), wherein the motor (13) is short in axial direction.

18. A geared motor (10) with a flat construction as a sub-assembly of a motor and gear drive in a housing with an axially short housing/base body (11), that on one side of a yoke disc (14) is fitted with a motor (13) with a disc-shaped rotor geometry and on the opposite side with a gear drive (15) that is driven through the yoke disc (14) by the motor (13), characterised in that an H-shaped housing/base body (11) is fitted with a wobble wheel drive within its rim (12) surrounding the yoke disc (14) that has spokes or is enclosed by a flat; a driven ring (20) being a part of the wobble wheel drive; and characterised in that the support disc is made from plastic material and is furnished with a structurised metallising according to the MID technology for the current circuit of the disc rotor (51).

* * * * *